(12) United States Patent
Savransky et al.

(10) Patent No.: US 7,577,825 B2
(45) Date of Patent: Aug. 18, 2009

(54) METHOD FOR DATA VALIDITY TRACKING TO DETERMINE FAST OR SLOW MODE PROCESSING AT A RESERVATION STATION

(75) Inventors: Guillermo Savransky, Haifa (IL); Nicolas Worms, Haifa (IL)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 11/363,195

(22) Filed: Feb. 28, 2006

(65) Prior Publication Data

US 2007/0204138 A1    Aug. 30, 2007

(51) Int. Cl.
*G06F 9/00* (2006.01)
(52) U.S. Cl. .................................... 712/217
(58) Field of Classification Search ................ 712/214, 712/217, 218, 220
See application file for complete search history.

(56) References Cited

U.S. PATENT DOCUMENTS

| | | | | |
|---|---|---|---|---|
| 5,463,745 A | * | 10/1995 | Vidwans et al. | 712/218 |
| 5,987,594 A | * | 11/1999 | Panwar et al. | 712/216 |
| 6,094,717 A | * | 7/2000 | Merchant et al. | 712/32 |
| 6,098,166 A | * | 8/2000 | Leibholz et al. | 712/216 |
| 6,341,370 B1 | * | 1/2002 | Tirumalai et al. | 717/141 |
| 6,550,003 B1 | * | 4/2003 | Pettersson et al. | 712/218 |

OTHER PUBLICATIONS

Shen at al., "Modern Processor Design—Fundamentals of Superscalar Processors," 2004, pp. 201, 208, 258-259.*
Vallurri et al., "Evaluating Register Allocation and Instruction Scheduling Techniques in Out-of-Order Issue Processors", 1999, 6 pages.*

* cited by examiner

*Primary Examiner*—David J Huisman
(74) *Attorney, Agent, or Firm*—Pearl Cohen Zedek Latzer, LLP (57) ABSTRACT

Devices, systems, and methods may perform micro-operation processing with data validity tracking to determine fast or slow mode processing at a reservation station. A method includes determining whether a condition related to validity of data in a reorder buffer of an out-of-order subsystem of a processor core is met, based on a criterion other than a valid data indication from said reorder buffer. In one embodiment, in a fast mode a reservation station may dispatch micro-operations to execution and in a slow mode the reservation station may wait for a valid indication from the reorder buffer prior to dispatching the micro-operation.

9 Claims, 6 Drawing Sheets

METHOD FOR DATA VALIDITY TRACKING TO DETERMINE FAST OR SLOW MODE PROCESSING AT A RESERVATION STATION

BACKGROUND OF THE INVENTION

A processor core may include one or more execution units (EUs) able to execute micro-operations ("u-ops"), for example, utilizing an out-of-order (OOO) subsystem. For example, an instruction decoder (ID) may decode a macro-instruction, intended for execution by the processor, into micro-operations. A reservation station (RS) may dispatch the micro-operations to the EUs for execution.

The RS may utilize speculative write-back indications, for example, to allow processing of relatively "young" micro-operations, e.g., even if processing of a currently-executed micro-operation may not compete successfully. Write-back indications may be sent, for example, by the RS to a register-alias table (RAT) which may perform register renaming, e.g., logical to physical mapping of registers. Based on the assumption that no invalid data exists, other micro-operations may be considered for scheduling for execution in parallel to reading sources from a register file.

Unfortunately, a write-back indication may turn out to be incorrect, and a performance penalty may be required to avoid processing of invalid data. For example, the RAT may track availability of data on a reorder buffer (ROB) entry; if a write-back indication is not followed by valid data, then the RAT may indicate that the result of the micro-operation is available in the ROB, thereby allowing allocation of ROB read ports. However, the RS may not be able to immediately consider for scheduling the next micro-operation for execution, since the speculative write-back indication may be incorrect. Instead, a "valid" bit may be read from the ROB and sent to the RS, thereby resulting in a performance delay of one or more processing cycles.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Although embodiments of the invention are not limited in this regard, embodiments of the invention may be used in conjunction with many apparatuses, for example, a computer, a computing platform, a personal computer, a desktop computer, a mobile computer, a laptop computer, a notebook computer, a personal digital assistant (PDA) device, a tablet computer, a server computer, a network, a wireless device, a wireless station, a wireless communication device, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and/or "a plurality" as used herein may include, for example, "multiple" or "two or more". The terms "plurality" and/or "a plurality" may be used herein describe two or more components, devices, elements, parameters, or the like. For example, a plurality of elements may include two or more elements.

Figure 1:
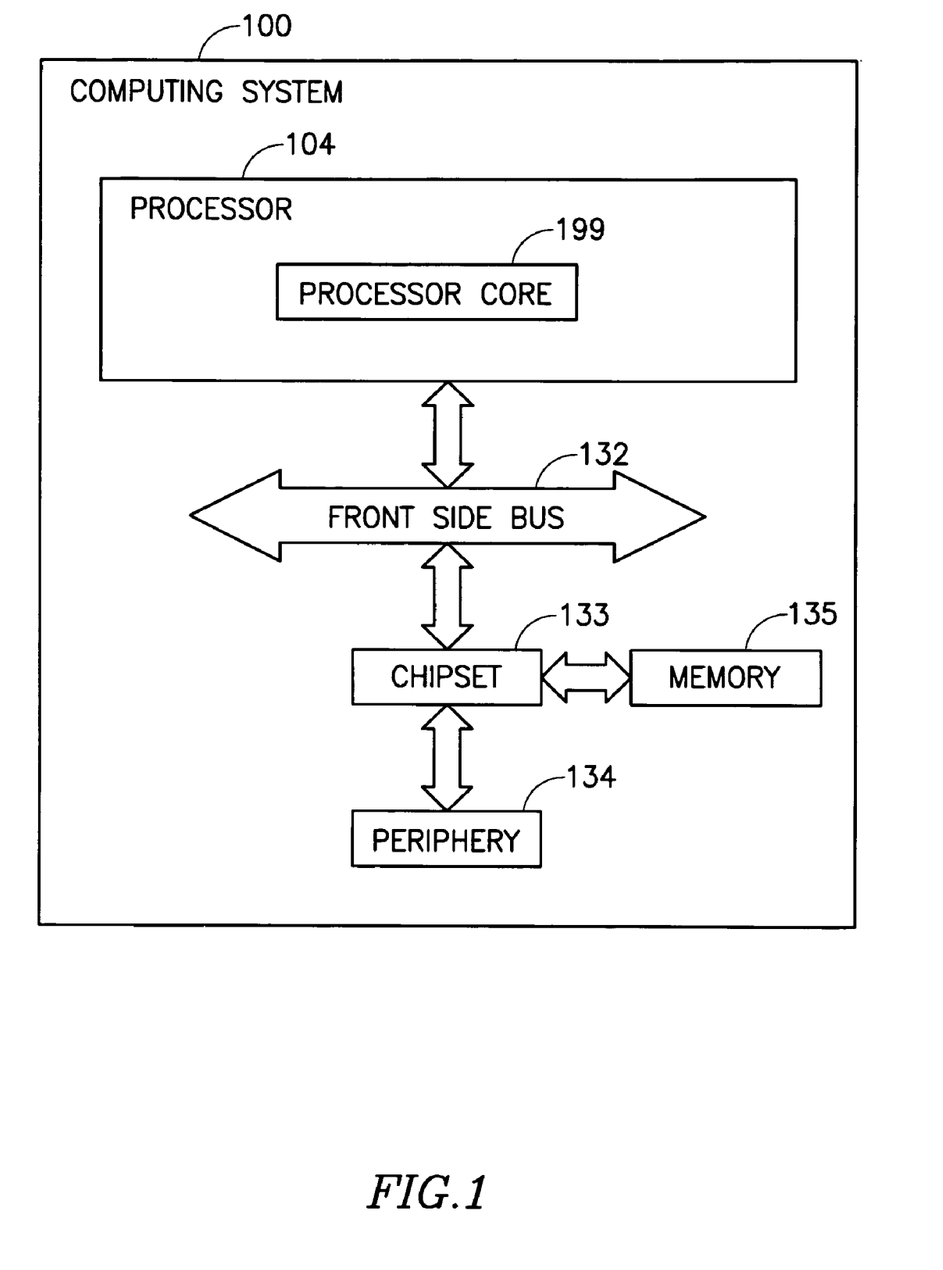
FIG. 1 is a schematic block diagram illustration of a computing system able to utilize data validity tracking in accordance with an embodiment of the invention.

FIG. 1 schematically illustrates a computing system 100 able to utilize data validity tracking in accordance with some embodiments of the invention. Computing system 100 may include or may be, for example, a computing platform, a processing platform, a personal computer, a desktop computer, a mobile computer, a laptop computer, a notebook computer, a terminal, a workstation, a server computer, a PDA device, a tablet computer, a network device, a cellular phone, or other suitable computing and/or processing and/or communication device.

Computing system 100 may include a processor 104, for example, a central processing unit (CPU), a digital signal processor (DSP), a microprocessor, a host processor, a controller, a plurality of processors or controllers, a chip, a microchip, or any other suitable multi-purpose or specific processor or controller. Processor 104 may include one or more processor cores, for example, a processor core 199. Processor core 199 may optionally include, for example, an out-of-order (OOO) module or subsystem, an execution block or subsystem, one or more execution units (EUs), one or more adders, multipliers, shifters, logic elements, combination logic elements, AND gates, OR gates, NOT gates, XOR gates, switching elements, multiplexers, sequential logic elements, flip-flops, latches, transistors, circuits, sub-circuits, and/or other suitable components. In some embodiments, processor core 199 may utilize data validity tracking as described in detail herein.

Computing system 100 may further include a shared bus, for example, a front side bus (FSB) 132. For example, FSB 132 may be a CPU data bus able to carry information between processor 104 and one or more other components of computing system 100.

In some embodiments, for example, FSB 132 may connect between processor 104 and a chipset 133. The chipset 133 may include, for example, one or more motherboard chips, e.g., a "northbridge" and a "southbridge", and/or a firmware hub. Chipset 133 may optionally include connection points, for example, to allow connection(s) with additional buses and/or components of computing system 100.

Computing system 100 may further include one or more peripheries 134, e.g., connected to chipset 133. For example, periphery 134 may include an input unit, e.g., a keyboard, a keypad, a mouse, a touch-pad, a joystick, a microphone, or other suitable pointing device or input device; and/or an output unit, e.g., a cathode ray tube (CRT) monitor, a liquid crystal display (LCD) monitor, a plasma monitor, other suitable monitor or display unit, a speaker, or the like; and/or a storage unit, e.g., a hard disk drive, a floppy disk drive, a compact disk (CD) drive, a CD-recordable (CD-R) drive, or other suitable removable and/or fixed storage unit. In some embodiments, for example, the aforementioned output devices may be coupled to chipset 133, e.g., in the case of a computing system 100 utilizing a firmware hub.

Computing system 100 may further include a memory 135, e.g., a system memory connected to chipset 133 via a memory bus. Memory 135 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Computing system 100 may optionally include other suitable hardware components and/or software components.

Figure 2:
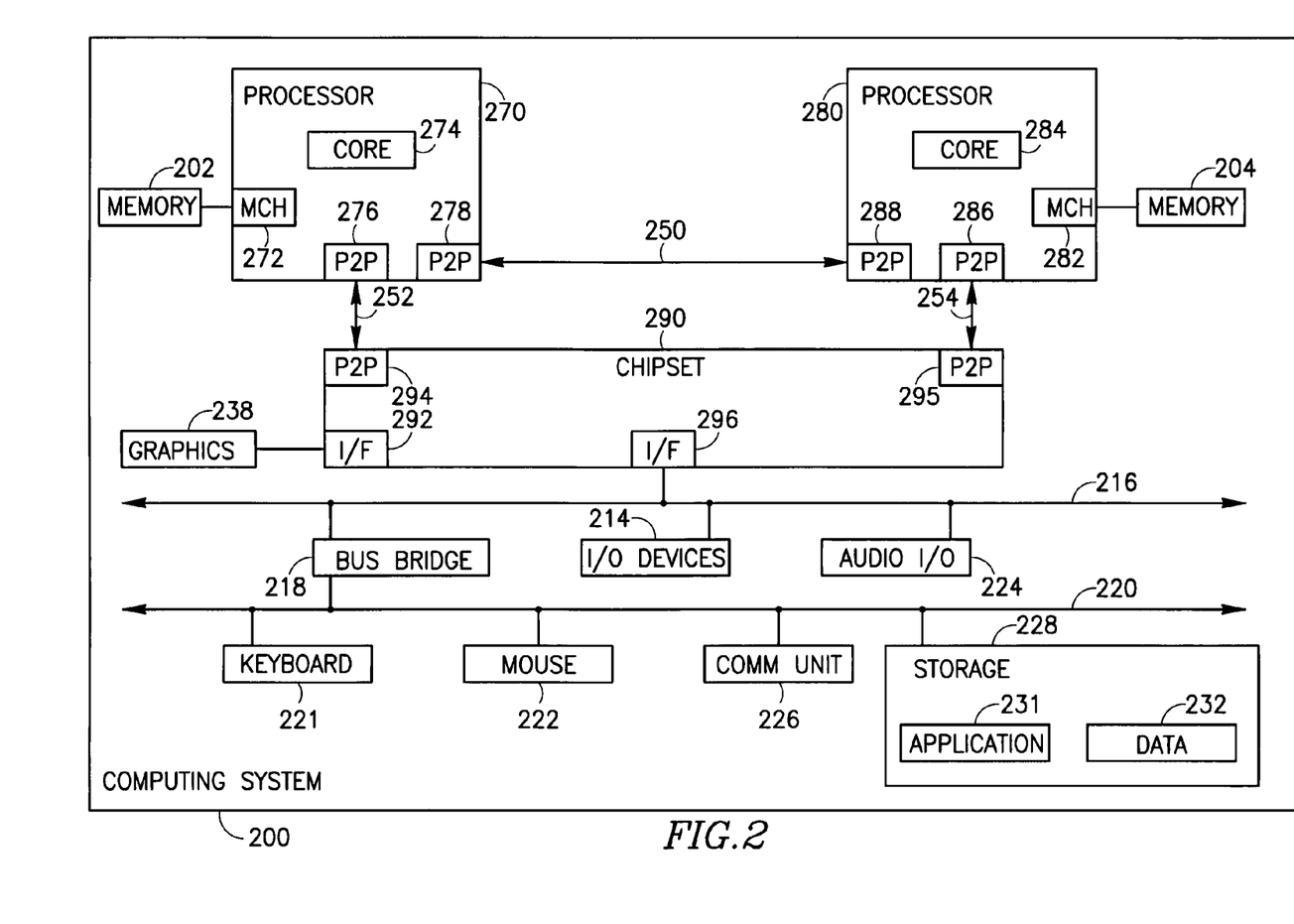
FIG. 2 is a schematic block diagram illustration of a computing system able to utilize data validity tracking in accordance with another embodiment of the invention.

FIG. 2 schematically illustrates a computing system 200 able to utilize data validity tracking in accordance with some embodiments of the invention. Computing system 200 may include or may be, for example, a computing platform, a processing platform, a personal computer, a desktop computer, a mobile computer, a laptop computer, a notebook computer, a terminal, a workstation, a server computer, a PDA device, a tablet computer, a network device, a cellular phone, or other suitable computing and/or processing and/or communication device.

Computing system 200 may include, for example, a point-to-point busing scheme having one or more processors, e.g., processors 270 and 280; memory units, e.g., memory units 202 and 204; and/or one or more input/output (I/O) devices, e.g., I/O device(s) 214, which may be interconnected by one or more point-to-point interfaces.

Processors 270 and/or 280 may include, for example, processor cores 274 and 284, respectively. In some embodiments, processor cores 274 and/or 284 may utilize data validity tracking as described in detail herein.

Processors 270 and 280 may further include local memory channel hubs (MCH) 272 and 282, respectively, for example, to connect processors 270 and 280 with memory units 202 and 204, respectively. Processors 270 and 280 may exchange data via a point-to-point interface 250, e.g., using point-to-point interface circuits 278 and 288, respectively.

Processors 270 and 280 may exchange data with a chipset 290 via point-to-point interfaces 252 and 254, respectively, for example, using point-to-point interface circuits 276, 294, 286, and 295. Chipset 290 may exchange data with a high-performance graphics circuit 238, for example, via a high-performance graphics interface 292. Chipset 290 may further exchange data with a bus 216, for example, via a bus interface 296. One or more components may be connected to bus 216, for example, an audio I/O unit 224, and one or more input/output devices 214, e.g., graphics controllers, video controllers, networking controllers, or other suitable components.

Computing system 200 may further include a bus bridge 218, for example, to allow data exchange between bus 216 and a bus 220. For example, bus 220 may be a small computer system interface (SCSI) bus, an integrated drive electronics (IDE) bus, a universal serial bus (USB), or the like. Optionally, additional I/O devices may be connected to bus 220. For example, computing system 200 may further include, a keyboard 221, a mouse 222, a communications unit 226 (e.g., a wired modem, a wireless modem, a network interface, or the like), a storage device 228 (e.g., to store a software application 231 and/or data 232), or the like.

Figure 3:
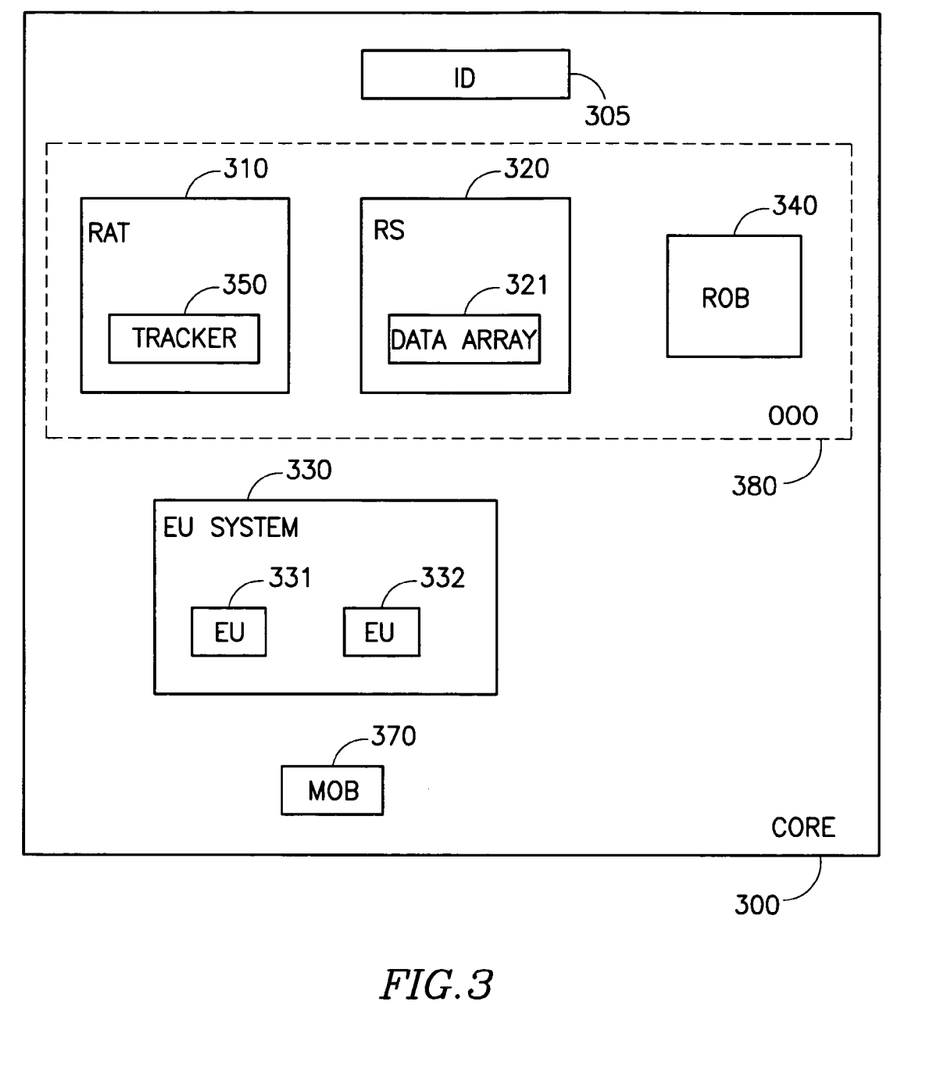
FIG. 3 is a schematic block diagram illustration of a processor core able to utilize data validity tracking in accordance with an embodiment of the invention.

FIG. 3 schematically illustrates a processor core 300 able to utilize data validity tracking in accordance with some embodiments of the invention. Processor core 300 may be an example of processor core 199 of FIG. 1, an example of processor core 274 of FIG. 2, an example of processor core 284 of FIG. 2, or a processor core utilized in conjunction with other suitable processors or processing platforms.

Processor core 300 may receive, for example, from a memory unit, e.g., from memory unit 135 of FIG. 1 or from memory units 202 or 204 of FIG. 2, one or more macro-instructions intended for execution. Processor core 300 may execute the macro-instructions substantially in order, for example, substantially in the same order the macro-instructions are received by processor core 300. Alternatively, processor core 300 may execute the macro-instructions out of order, for example, in an order different than the order the macro-instructions are received by processor core 300. In some embodiments, processor core 300 may produce results of the macro-instructions in substantially the same order the macro-instructions are received by processor core 300.

Processor core 300 may include, for example, a macro instruction decoder (ID) 305, an an out-of-order (OOO) subsystem 380, an execution system 330, and a memory order buffer (MOB) 370. The OOO subsystem 380 may include, for example, a register alias table (RAT) 310, a reservation station (RS) 320, and a reorder buffer (ROB) 340. Processor core 300 and/or OOO subsystem 380 may include other suitable hardware components and/or software components.

Execution system 330 may include one or more execution units (EUs), for example, an EU 331 and an EU 332.

The ID 305 may receive a macro-instruction intended for execution by processor core 300. The ID 305 may decode the macro-instruction into one or more micro-operations, for example, depending upon a type of the macro-instruction. In some embodiments, for example, the ID 305 may decode the macro-instruction into a plurality of micro-operations of different types, e.g., a first micro-operation of a first type intended for execution by EU 331, and a second micro-operation of a second type intended for execution by EU 332. A micro-operation may be executed by the EU 331 or 332 with relation to one or more source operands, for example, source operands which may be received by RS 320, e.g., from ID 305, from ROB 340, or from execution system 330.

The ID 305 may generate, for example, an operation code ("op-code") representing the type of operation intended to be performed on the source operands. Optionally, the ID 305 may further generate signals indicating a width of the source operands, and/or signals indicating the type of EU intended to execute the micro-operation.

The RAT 310 may receive the signals generated by ID 305, for example, substantially in the same order the micro-operations were generated by ID 305. The RAT 310 may determine which of the EUs of execution system 330 is to execute a micro-operation corresponding to a generated op-code. In some embodiments, RAT 310 may provide to RS 320 and to ROB 340 signals corresponding to the op-code and to the source operand width. The RAT 310 may further provide to RS 320 signals indicating a selected EU intended to execute the micro-operation.

In some embodiments, RS 320 may store and/or handle more than one micro-operation at a time. For example, RS 320 may include a data array 321 able to store one or more source operands corresponding to the one or more micro-operations generated by ID 305. The RS 320 may controllably provide or "dispatch" to an EU of execution system 330, e.g., to EU 331, an op-code and/or one or more source operands corresponding to a micro-operation.

Upon execution of the micro-operation by the execution system 330, ROB 340 may receive execution results from the execution system 330, e.g., optionally according to the original order of micro-operations generated by ID 305 or in an order different from the original order. The ROB 340 may output the execution results, for example, to a retired register file associated with processor core 300, and/or to RS 320.

In some embodiments, RS 320 may send write-back indications to RAT 310, e.g., indicating that a result is expected from the execution system 330 to a register handled by the RAT 310. For example, a write-back indication may be sent by RS 320 after dispatching a micro-operation to EU 331 for execution, e.g., when RS 320 determines that the results of the execution of the micro-operations are expected to be available. Additionally or alternatively, for example, a write-back indication may be sent to RAT 310 based on indications from the MOB 370.

The write-back indication may be speculative, for example, it may indicate that modification of a content of a register handled by the RAT 310 is expected, but is not guaranteed to occur. A write-back indication may turn out to be incorrect, for example, the micro-operation which utilizes a cached data item may not be performed if the cache memory is not up-to-date ("cache miss"). For example, if a cache miss occurs, the MOB 370 may send an "invalid" bit or signal; whereas if a cache hit occurs, a "valid" bit or signal may be sent.

Processor core 300 may include a tracker 350, which may be implemented, for example, as part of RAT 310, as part of other component(s) of processor core 300, or as a stand-alone unit or module of processor core 300. Tracker 350 may include, for example, a finite state machine (FSM) able to track the existence of past speculative write-back indications that are followed by invalid data. In some embodiments, tracker 350 may be in one of two states: a first state, e.g., a "slow mode" state, indicating that there is a possibility that invalid data was written back; and a second state, e.g., a "fast mode" state, indicating that all the data that was written back is valid.

In some embodiments, when tracker 350 is in "slow mode" state, processor core 300 may operate conservatively. For example, RS 320 may not assume that the data will be provided at a certain time, and thus RS 320 may not immediately consider to dispatch to execution the micro-operation that was just received from RAT 310; since, for example, due to the speculative write-back indication, data expected to be available may not yet be available. Instead, a performance delay may be required until a "valid" bit is read from ROB 340 and sent to RS 320.

In contrast, when tracker 350 is in "fast mode" state, processor 300 may operate based on the indication that the data in the ROB 340 is valid such that the RS 320 may consider for dispatch the micro-operation that was just received from RAT 310, e.g., without a performance delay.

In some embodiments, the state of tracker 350 may be utilized by processor core 300, to determine whether the RS 320 is required to wait for a "valid" bit or signal from the ROB 340 (e.g., if tracker 350 is in "slow mode" state), or whether the RS 320 may substantially immediately consider to dispatch a micro-operation to execution.

In some embodiments, tracker 350 may enter "fast mode" state when there are no past speculative write-back indications that have been followed by invalid data. In some embodiments, for example, the opposite approach may not hold true; for example, tracker 350 may not enter "fast mode" state when there are speculative write-back indications that have been followed by invalid data. For example, in one embodiment, tracker 350 may change from "slow mode" state to "fast mode" state when a cancelled operation retires, and not when valid data is received.

In some embodiments, one or more rules, conditions or criteria may be used by tracker 350 to determine whether to enter "slow mode" state, or whether to enter "fast mode" state. In some embodiments, for example, tracker 350 may enter "fast mode" state upon a reset of RAT 310; upon a signal (e.g., "RO-clear") that clears the content of the OOO subsystem 380; upon a signal (e.g., "RO-nuke") that indicates that a micro-operation faulted and clears the OOO subsystem 380 (and other components, e.g., a front-end subsystem having the ID 305); or upon detecting retirement of the youngest canceled micro-operation, e.g., upon detecting retirement of the last micro-operation that provided write-back indication that was not followed with valid data.

In some embodiments, for example, tracker 350 may enter "slow mode" state upon detecting that a micro-operation provides a write-back indication not followed by valid data, e.g., upon a write-back of a micro-operation that misses a cache.

In some embodiments, tracker 350 may determine whether or not there is a certainty that the ROB 340 will provide valid data for substantially all the cases in which the RAT 310 determines that the data resides in the ROB 340, e.g., that the write-back indications for all the micro-operations that did not yet retire were followed by valid data. If the determination result is positive, then the RS 320 may take into account that the ROB 340 will provide valid data, without waiting to receive a "valid" bit or signal from the ROB 340. Accordingly, RS 320 may proceed with the dispatching process of the micro-operation or with the decision-making process of dispatching the micro-operation, and may dispatch the micro-operation if other relevant conditions for dispatching hold true and/or by taking into account other dispatching criteria, for example, if an EU is available, if a write-back port is available, if the micro-operation is waiting to be dispatched longer than other micro-operations, or the like.

In some embodiments, when tracker 350 is in "fast mode", it is certain that substantially all the data which RAT 310 expects to be in ROB 340 is in fact in ROB 340. In contrast, when tracker 350 is in "slow mode", it is not certain that the data which RAT 310 expects to be in ROB 340 is in fact in ROB 340; and the RS 320 may wait for a 'valid' indication (e.g., bit or signal) from ROB 340, prior to determining whether or not to dispatch the micro-operation to execution.

Figure 4:
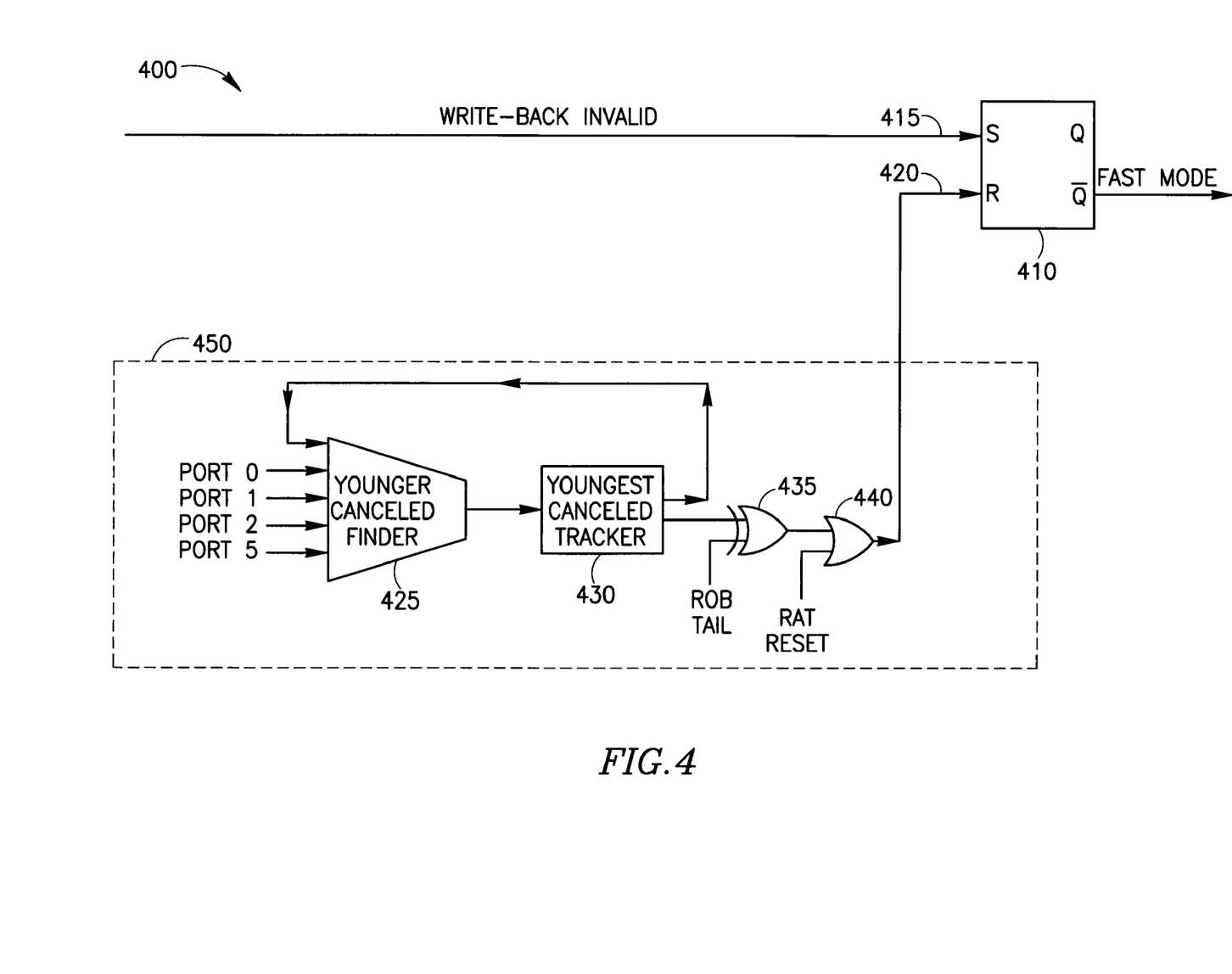
FIG. 4 is a schematic block diagram illustration of a circuit able to set a "fast mode" in accordance with an embodiment of the invention.

FIG. 4 schematically illustrates a circuit 400 able to set a "fast mode" in accordance with some embodiments of the invention. Circuit 400 may be used, for example, by tracker 350 of FIG. 3, and/or by other suitable components, devices and/or systems.

In some embodiments, a one-bit memory 410 may be used to indicate a "fast mode" or a "slow mode". The one-bit memory 410 may be implemented, for example, using a flip-flop or other suitable logic. For example, in some embodiments, the value or the output of the one-bit memory 410 may be "0" to indicate "fast mode" or "1" to indicate "slow mode", or vice versa As indicated by arrow 415, a bit or a signal indicating an invalid write-back, for example, received from a data cache unit (DCU), may enter the one-bit memory 410. For example, if an invalid write-back bit or signal is received, then the one-bit memory 410 may have or may output a value of "1", which may correspond to "slow mode".

As indicated by arrow 420, an input from a parallel sub-circuit 450 may enter the one-bit memory 410. For example, youngest canceled tracker 430 may indicate the most recent micro-operation that was dispatched for execution and was cancelled, e.g., by RS or MOB. The youngest cancelled micro-operation may be determined utilizing a youngest canceled finder 425. The youngest canceled finder 425 may receive multiple inputs, for example, from multiple ports of physical destinations, e.g., from EUs and/or from a memory unit. The youngest canceled finder 425 may further receive as input from the youngest canceled tracker 430 an indication of the previously-calculated youngest cancelled micro-operation. The youngest canceled tracker 430 may determine the youngest canceled micro-operation based on the multiple inputs from the ports of physical destinations and the input from the youngest canceled tracker 430.

The youngest canceled tracker 430 may output an indication of the youngest canceled micro-operation. The output may enter a XOR gate 435 together with a ROB tail, for example, a retirement pointer which may point to the last retired micro-operation, e.g., the last micro-operation that was successfully executed and for which all the younger micro-operations were successfully executed. The output of the XOR gate 435 may enter an OR gate 440, together with a signal indicating that the reset conditions of the RAT hold true. The output of the OR gate 440 may enter the one-bit memory 410. In some embodiments, for example, the output of sub-circuit 450 may be "1" if the youngest canceled micro-operation is the last retired micro-operation, thereby indicating that "fast mode" may be entered. For example, "fast mode" may be entered if the youngest canceled micro-operation is the last retired micro-operation.

Figure 5:
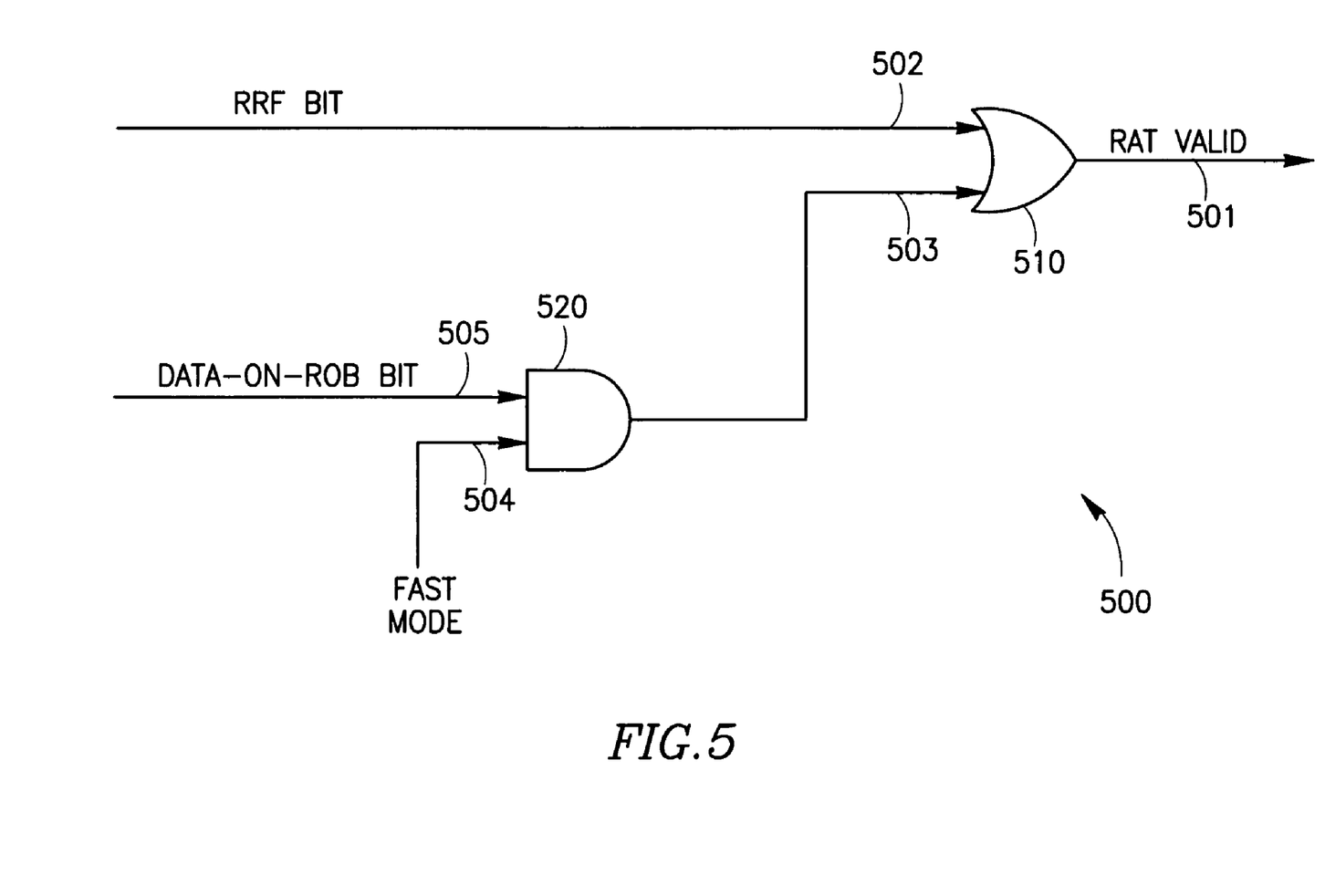
FIG. 5 is a schematic block diagram illustration of a circuit able to utilize a "fast mode" indication to generate a "valid" indication in accordance with an embodiment of the invention.

FIG. 5 schematically illustrates a circuit 500 able to utilize a "fast mode" indication to generate a "valid" indication 501 in accordance with some embodiments of the invention. Circuit 500 may be used, for example, by tracker 350 of FIG. 3, and/or by other suitable components, devices and/or systems.

As indicated by arrow 504, a "fast mode" indication may be received, for example, from a circuit able to determine "fast mode", e.g., circuit 400 of FIG. 4. The "fast made" indication may enter an AND gate 520. Additionally, as indicated by arrow 505, a data-on-ROB bit, e.g., a bit indicating that data is available on the ROB, may further enter the AND gate 520. As indicated by arrow 503, the output of the AND gate 520 may enter an OR gate 510; as indicated by arrow 502, a retirement register file (RRF) bit may further enter the OR gate 510, which may output an indication that the RAT data is valid 501. In some embodiments, for example, a "valid" RAT data indication 501 may be generated if a RRF bit is received; and/or if a "fast mode" indication is received and a data-on-ROB bit is received.

Figure 6:
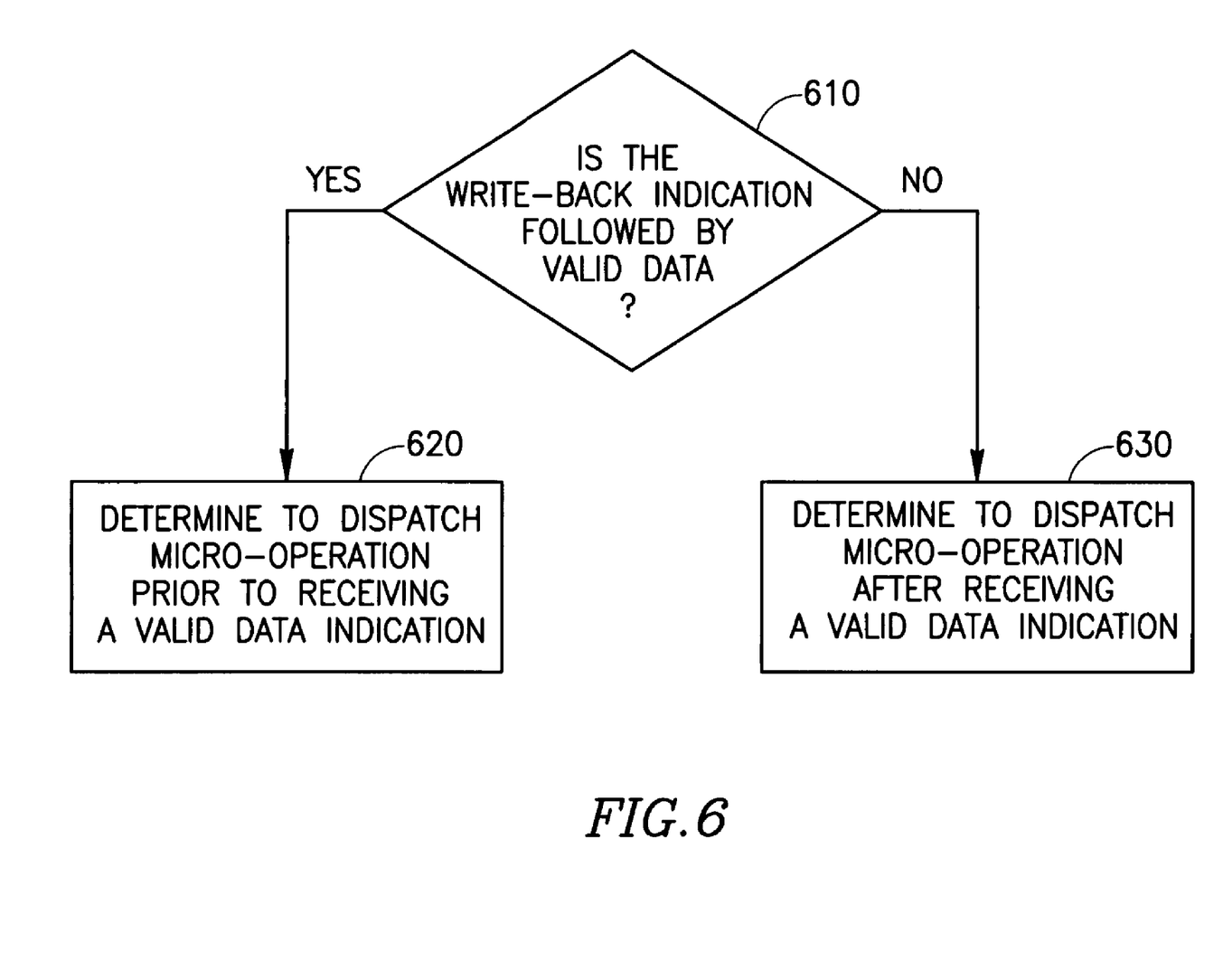
FIG. 6 is a schematic flow-chart of a method of tracking data validity in accordance with an embodiment of the invention.

FIG. 6 is a schematic flow-chart of a method of tracking data validity in accordance with an embodiment of the invention. Operations of the method may be implemented, for example, by tracker 350 of FIG. 3, by processor core 300 of FIG. 3, and/or by other suitable computers, processors, components, devices, and/or systems.

As indicated at box 610, the method may optionally include, for example, determining whether a write-back indication associated with a micro-operation and sent to a register alias table is followed by valid data, prior to receiving a valid data indication associated with the micro-operation from a ROB. This may include, for example, determining by a tracker or tracking unit of the RAT, whether or not substantially all the data which is expected by the RAT to be in the ROB is in fact in the ROB, i.e., whether or not invalid data exists in the ROB.

As indicated at box 620, if the determination result is positive, then the-method may include, for example, determining whether to dispatch a micro-operation to execution, e.g., a micro-operation just received by the RS from the RAT, for example, prior to receiving the valid data indication from the ROB.

Conversely, as indicated at box 630, if the determination result is negative, then the method may include, for example, withholding or delaying the determination of whether or not to dispatch a micro-operation to execution (e.g., a micro-operation just received by the RS from the RAT) until a valid data indication is received from the ROB. This may include, for example, determining to dispatch the micro-operation to execution only if, or after, a valid data indication is received, e.g., from the ROB.

In some embodiments, for example, a method may include determining whether a condition related to validity of data in a reorder buffer of an out-of-order subsystem of a processor core is met, based on a criterion other than a valid data indication from said reorder buffer. In some embodiments, for example, the method may include determining whether the condition is met prior to receiving said valid data indication from said reorder buffer.

In some embodiments, for example, the method may include, if it is determined that the condition is met, and prior to receiving said valid data indication from the reorder buffer, determining whether to dispatch for execution a micro-operation received by a reservation station of said out-of-order subsystem. In some embodiments, for example, the method may include, based on said criterion, determining that said reorder buffer contains substantially all data that is expected to be in said reorder buffer according to a register alias table of said out-of-order subsystem.

In some embodiments, for example, the method may include determining that said reorder buffer contains substantially all data that is expected to be in said reorder buffer according to a register alias table of said out-of-order subsystem, for example, if a write-back indication is not followed by invalid data; and/or in response to a signal to clear the out-of-order subsystem; and/or in response to a signal indicating that execution of a micro-operation faulted; and/or upon detection of retirement of a youngest canceled micro-operation; and/or if a youngest canceled micro-operation is a last retired micro-operation.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by processor cores 300, by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 135 or 202), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for processing micro-operations in a computer processor comprising:
   determining, by a hardware processor core of the computer processor, whether a condition related to validity of data in a hardware reorder buffer of an out-of-order subsystem of the processor core is met by tracking past speculative write-back indications followed by invalid data within a register alias table, wherein said tracking comprises receiving a signal from a data cache unit indicating the validity of a write-back operation for one of said speculative write-back indications and said tracking comprises receiving from a parallel sub-circuit an indication from a youngest cancelled finder of the most recent micro-operation that was dispatched for execution and cancelled; and
   processing a micro-operation received at a hardware reservation station in a fast mode or slow mode state that is set according to the determination such that in fast mode state the reservation station immediately considers to dispatch said micro-operation to execution and in slow mode state the reservation station waits for a valid indication from said reorder buffer prior to immediately considering to dispatch said micro-operation to execution.

2. The method of claim 1, wherein determining comprises:
   determining whether the condition is met prior to receiving said valid data indication from said reorder buffer.

3. The method of claim 1, further comprising:
   if it is determined that the condition is met, and prior to receiving said valid data indication from the reorder buffer, determining whether to dispatch for execution a micro-operation received by a reservation station of said out-of-order subsystem.

4. The method of claim 1, wherein determining whether a condition is met comprises:
   determining that said reorder buffer contains data that is expected to be in said reorder buffer according to said register alias table.

5. The method of claim 1, wherein determining whether a condition is met comprises:
   if a write-back indication is not followed by invalid data, determining that said reorder buffer contains data that is expected to be in said reorder buffer according to said register alias table.

6. The method of claim 1, wherein determining whether a condition is met comprises:
   in response to a signal to clear the out-of-order subsystem, determining that said reorder buffer contains data that is expected to be in said reorder buffer according to said register alias table.

7. The method of claim 1, wherein determining whether a condition is met comprises:
   in response to a signal indicating that execution of a micro-operation faulted, determining that said reorder buffer contains data that is expected to be in said reorder buffer according to said register alias table.

8. The method of claim 1, wherein determining whether a condition is met comprises:
   upon detection of a reset of said register alias table, determining that said reorder buffer contains data that is expected to be in said reorder buffer.

9. The method of claim 1, wherein determining whether a condition is met comprises:
   testing an indication of the youngest cancelled micro-operation with a reorder buffer tail and a signal indicating the reset condition of a said register alias table and, by that test, determining that said reorder buffer contains data that is expected to be in said reorder buffer according to said register alias table.

* * * * *